United States Patent Office 3,349,097
Patented Oct. 24, 1967

3,349,097
WATER-SOLUBLE PHTHALOCYANINE DYE-STUFFS AND PROCESS FOR PREPARING THEM
Rudolf Kühne and Fritz Meininger, Frankfurt am Main, and Walter Noll, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Mar. 26, 1965, Ser. No. 443,084
Claims priority, application Germany, Dec. 1, 1960, F 32,665
6 Claims. (Cl. 260—314.5)

This invention is a continuation-in-part application of U.S. patent application Ser. No. 155,497 filed Nov. 28, 1961, now abandoned, it relates to valuable new phthalocyanine dyestuffs and to a process for preparing them; in particular it relates to new phthalocyanine dyestuffs of the general Formula 1

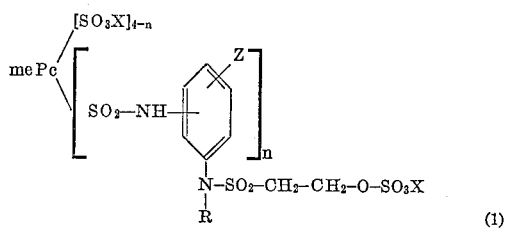

wherein mePc represents copper or nickel phthalocyanine, X hydrogen or an alkali metal, R hydrogen or lower alkyl having from 1 to 5 carbon atoms, Z hydrogen or halogen, such as chlorine or bromine, or lower alkyl or lower alkoxy, and $n$ an integer from 1 to 3.

We have found that the valuable new phthalocyanine dyestuffs of the foregoing general Formula 1 are obtained by condensing 1 mol of a compound of the general Formula 2

$$mePc[SO_2-Cl]_4 \quad (2)$$

wherein mePc is defined as above, with 1 to 3 mols of an N-ethionylaminoarylamine of the general Formula 3

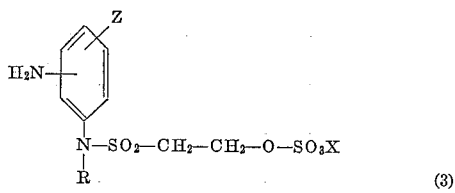

or with 1 to 3 mols of an N-isethionylamino-arylamine of the general Formula 4

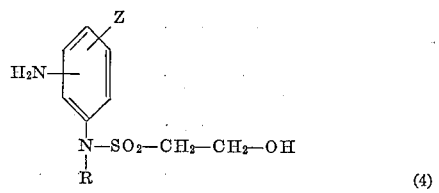

in which Z, R and X are defined as above, and, if an amine of the general Formula 4 has been employed, converting the condensation product into the corresponding acid sulfuric acid ester.

The arylamines of the aforesaid Formula 3 can be prepared by the reaction of carbylsulfate with nitroarylamines followed by the catalytic reduction of the nitroaryl compounds obtained containing N-ethionylamino groups as substituents. The arylamines of the aforesaid Formula 4 can be prepared by the reaction of carbylsulfate with nitroarylamines followed by the catalytic reduction of the nitro aryl compounds obtained containing N-ethionyl-amino groups as substituents and saponifying the sulfuric acid ester grouping.

The condensation of the copper or nickel phthalocyanine-tetrasulfonic acid chloride with the amines of the composition indicated above is advantageously carried out in an aqueous medium in the presence of acid binding agents at a temperature between about 0° C. and 30° C. and a pH-value between about 4 and 9. If desired, the reaction may be carried out in the presence of organic solvents such as acetone, methylene chloride or ethylene chloride.

As acid binding agents there may be used the N-ethionylamino- or N-isethionylamino-arylamines used in excess or nitrogenous tertiary organic bases such as pyridine and picoline, or more advantageously inorganic compounds, such as sodium hydroxide solution, sodium bicarbonate, sodium carbonate, potassium carbonate, potassium bicarbonate or sodium acetate. The condensation may also be carried out in an organic solvent free from water, such as pyridine, dimethylformamide, N-methylacetamide or phosphoric acid-tris-dimethylamide, in the presence or absence of diluents, such as methylene chloride, acetone or methanol.

The condensation compounds containing N-isethionyl-amino groups can be converted into dyestuffs containing N-ethionylamino groups by esterifying the hydroxyl groups of the isethionylamino groups with sulfuric acid or by reaction with acid salts, for example alkali metal salts of chlorosulfonic acid.

The condensation of the copper- or nickel phthalocyanine-tetrasulfonic acid chlorides with arylamines of the composition indicated above may be carried out in such a manner that less amount of amine is used than it corresponds to the amount corresponding to the acid halide groups. For example, only one, two or three sulfonic acid chloride groups of the phthalocyanine-tetrasulfonic acid chloride can be reacted with the amines of Formula 1 or 2. The remaining sulfonic acid chloride groups are then saponified to sulfonic acid groups so that, if desired, after esterification, dyestuffs are obtained which contain N-ethionylamino groups and also sulfonic acid groups.

The starting compounds copper- or nickel phthalocyanine-tetrasulfonic acid chlorides are obtainable from copper or nickel phthalocyanine as described in U.S. Patent 2,219,330.

As N-ethionylamino arylamines there may be employed, for example, the following compounds (Table 1):

Table 1

4-N-ethionylamino-1-amino-benzene
3-N-ethionylamino-1-amino-benzene
2-N-ethionylamino-1-amino-benzene
4-N-ethionylamino-1-amino-2-methyl-benzene
4-N-ethionylamino-1-amino-2-methoxy-benzene
4-N-ethionylamino-1-amino-2-chloro-benzene
4-N-ethionylamino-1-amino-3-methyl-benzene
4-N-ethionylamino-1-amino-3-methoxy-benzene
4-N-ethionylamino-1-amino-3-chloro-benzene
4-N-ethionylamino-1-amino-2,5-dimethoxy-benzene
4-N-ethionylamino-1-amino-2-methoxy-5-methyl-benzene
4-N-ethionylamino-1-amino-2-methoxy-benzene
4-N-ethionylamino-1-amino-3-ethoxy-benzene
3-N-ethionylamino-1-amino-4-methyl-benzene
3-N-ethionylamino-1-amino-4-methoxy-benzene
3-N-ethionylamino-1-amino-4-ethoxy-benzene
3-N-ethionylamino-1-amino-4-chloro-benzene
3-N-ethionylamino-1-amino-4,6-dimethoxy-benzene
2-N-ethionylamino-1-amino-4-methyl-benzene
2-N-ethionylamino-1-amino-4-methoxy-benzene
2-N-ethionylamino-1-amino-4-chloro-benzene
2-N-ethionylamino-1-amino-5-methyl-benzene 2-N-ethionylamino-1-amino-5-methoxy-benzene
2-N-ethionylamino-1-amino-5-chloro-benzene
3-N-ethionylamino-1-amino-6-methyl-benzene
3-N-ethionylamino-1-amino-6-methoxy-benzene
3-N-ethionylamino-1-amino-6-ethoxy-benzene
3-N-ethionylamino-1-amino-6-chloro-benzene As N-isethionylamino aryl amines there may be employed the following compounds (Table 2):

*Table 2*

4-N-isethionylamino-1-amino-benzene
4-N-isethionylamino-1-amino-2-methyl-benzene
4-N-isethionylamino-1-amino-2-methoxy-benzene
4-N-isethionylamino-1-amino-2-chloro-benzene
4-N-isethionylamino-1-amino-3-methyl-benzene
4-N-isethionylamino-1-amino-3-methoxy-benzene
4-N-isethionylamino-1-amino-3-chloro-benzene
4-N-isethionylamino-1-amino-2,5-dimethoxy-benzene
4-N-isethionylamino-1-amino-2-methoxy-5-methyl-benzene
4-N-isethionylamino-1-amino-2-ethoxy-benzene
4-N-isethionylamino-1-amino-3-ethoxy-benzene
3-N-isethionylamino-1-amino-benzene
3-N-isethionylamino-1-amino-4-methyl-benzene
3-N-isethionylamino-1-amino-4-methoxy-benzene
3-N-isethionylamino-1-amino-4-ethoxy-benzene
3-N-isethionylamino-1-amino-4-chloro-benzene
3-N-isethionylamino-1-amino-6-methyl-benzene
3-N-isethionylamino-1-amino-6-methoxy-benzene
3-N-isethionylamino-1-amino-6-ethoxy-benzene
3-N-isethionylamino-1-amino-6-chloro-benzene
3-N-isethionaylamino-1-amino-4,6-dimethoxy-benzene
2-N-isethionylamino-1-amino-benzene
2-N-isethionylamino-1-amino-4-methyl-benzene
2-N-isethionylamino-1-amino-4-methoxy-benzene
2-N-isethionylamino-1-amino-4-chloro-benzene
2-N-isethionylamino-1-amino-5-methyl-benzene
2-N-isethionylamino-1-amino-5-methoxy-benzene
2-N-isethionylamino-1-amino-5-chloro-benzene As N-alkyl-N-ethionylamino-arylamines there may be employed the following compounds (Table 3):

*Table 3*

4-N-methyl-N-ethionylamino-1-amino-benzene
4-N-ethyl-N-ethionylamino-1-amino-benzene
4-N-propyl-N-ethionylamino-1-amino-benzene
4-N-butyl-N-ethionylamino-1-amino-benzene
4-N-pentyl-N-ethionylamino-1-amino-benzene
4-N-methyl-N-ethionylamino-1-amino-2-methyl-benzene
4-N-methyl-N-ethionylamino-1-amino-2-methoxy-benzene
4-N-methyl-N-ethionylamino-1-amino-2-ethoxy-benzene
4-N-methyl-N-ethionylamino-1-amino-2-chloro-benzene
4-N-ethyl-N-ethionylamino-1-amino-2-methyl-benzene
4-N-butyl-N-ethionylamino-1-amino-2-methoxy-benzene
4-N-methyl-N-ethionylamino-1-amino-3-methyl-benzene
4-N-methyl-N-ethionylamino-1-amino-3-methoxy-benzene
4-N-methyl-N-ethionylamino-1-amino-3-chloro-benzene
4-N-methyl-N-ethionylamino-1-amino-2,5-dimethoxy-benzene
4-N-methyl-N-ethionylamino-1-amino-2-methoxy-5-methyl-benzene
4-N-methyl-N-ethionylamino-1-amino-3-ethoxy-benzene
3-N-methyl-N-ethionylamino-1-amino-benzene
3-N-methyl-N-ethionylamino-1-amino-4-methyl-benzene
3-N-methyl-N-ethionylamino-1-amino-4-methoxy-benzene
3-N-methyl-N-ethionylamino-1-amino-4-chloro-benzene
3-N-methyl-N-ethionylamino-1-amino-4-ethoxy-benzene
3-N-methyl-N-ethionylamino-1-amino-6-methyl-benzene
3-N-methyl-N-ethionylamino-1-amino-6-methoxy-benzene
3-N-methyl-N-ethionylamino-1-amino-6-chloro-benzene
3-N-methyl-N-ethionylamino-1-amino-6-ethoxy-benzene
3-N-methyl-N-ethionylamino-1-amino-4,6-dimethoxy-benzene
2-N-methyl-N-ethionylamino-1-amino-benzene
2-N-methyl-N-ethionylamino-1-amino-4-methyl-benzene
2-N-methyl-N-ethionylamino-1-amino-4-methoxy-benzene
2-N-methyl-N-ethionylamino-1-amino-4-chloro-benzene
2-N-methyl-N-ethionylamino-1-amino-5-methyl-benzene
2-N-methyl-N-ethionylamino-1-amino-5-methoxy-benzene
2-N-methyl-N-ethionylamino-1-amino-5-chloro-benzene As N-alkyl-N-isethionylamino-arylamines there may be employed the following compounds (Table 4):

*Table 4*

4-N-methyl-N-isethionylamino-1-amino-benzene
4-N-ethyl-N-isethionylamino-1-amino-benzene
4-N-propyl-N-isethionylamino-1-amino-benzene
4-N-butyl-N-isethionylamino-1-amino-benzene
4-N-pentyl-N-isethionylamino-1-amino-benzene
4-N-methyl-N-isethionylamino-1-amino-2-methyl-benzene
4-N-methyl-N-isethionylamino-1-amino-2-methoxy-benzene
4-N-methyl-N-isethionylamino-1-amino-2-ethoxy-benzene
4-N-methyl-N-isethionylamino-1-amino-2-chloro-benzene
4-N-ethyl-N-isethionylamino-1-amino-2-methyl-benzene
4-N-butyl-N-isethionylamino-1-amino-2-methoxy-benzene
4-N-methyl-N-isethionylamino-1-amino-3-methyl-benzene
4-N-methyl-N-isethionylamino-1-amino-3-methoxy-benzene
4-N-methyl-N-isethionylamino-1-amino-3-chloro-benzene
4-N-methyl-N-isethionylamino-1-amino-2,5-dimethoxy-benzene
4-N-methyl-N-isethionylamino-1-amino-2-methoxy-5-methyl-benzene
4-N-methyl-N-isethionylamino-1-amino-3-ethoxy-benzene
3-N-methyl-N-isethionylamino-1-amino-benzene
3-N-methyl-N-isethionylamino-1-amino-4-methyl-benzene
3-N-methyl-N-isethionylamino-1-amino-4-methoxy-benzene
3-N-methyl-N-isethionylamino-1-amino-4-chloro-benzene
3-N-methyl-N-isethionylamino-1-amino-4-ethoxy-benzene
3-N-methyl-N-isethionylamino-1-amino-6-methyl-benzene
3-N-methyl-N-isethionylamino-1-amino-6-methoxy-benzene
3-N-methyl-N-isethionylamino-1-amino-6-chloro-benzene
3-N-methyl-N-isethionylamino-1-amino-6-ethoxy-benzene
3-N-methyl-N-isethionylamino-1-amino-4,6-dimethoxy-benzene
2-N-methyl-N-isethionylamino-1-amino-benzene
2-N-methyl-N-isethionylamino-1-amino-4-methyl-benzene
2-N-methyl-N-isethionylamino-1-amino-4-methoxy-benzene
2-N-methyl-N-isethionylamino-1-amino-4-chloro-benzene
2-N-methyl-N-isethionylamino-1-amino-5-methyl-benzene
2-N-methyl-N-isethionylamino-1-amino-5-methoxy-benzene
2-N-methyl-N-isethionylamino-1-amino-5-chloro-benzene The novel dyestuffs are obtained from a neutral or weakly acid solution by concentrating the solutions and/or esparating the products by addition of a precipitating agent, such as sodium chloride or potassium chloride and by subsequently filtering and washing. The aqueous dyestuff pastes are dried at a temperature between 40° and 60° C., if desired, under reduced pressure in order to avoid decomposition of the dystuffs.

The products obtainable by the present invention are new. They are valuable water-soluble dystuffs. They are suitable for dyeing and printing various materials such as wool, silk, polyamides or polyurethanes by the usual dyeing methods, for example from a neutral to weakly acid bath in the presence of ammonium acetate. The new dyestuffs are especially suitable for dyeing and printing materials containing cellulose, such as linen, regenerated cellulose and especially cotton. They are applied to the cellulose fibers by treating the material with an aqueous solution of the dyestuff at normal or raised temperature in the presence of an acid-binding agent, such as sodium hydroxide, potassium hydroxide, sodium bicarbonate, sodium carbonate, potassium carbonate or trisodium phosphate, or with a printing paste with the addition of an acid-binding agent, whereby the treatment with the acid-binding agent may be effected before, during or after the application of the dyestuff and by subsequently heating or steaming.

The dyeings or prints so obtained are distinguished by good fastness properties, especially by a good fastness to light and very good fastness to wet properties. They possess furthermore a high brilliancy.

The following examples serve to illustrate the invention but they are not intended to limit it thereto. The parts being by weight unless otherwise stated and the relationship of parts by weight to parts by volume being the same as that of the kilogram to the liter.

EXAMPLE 1

48.5 parts of copper-phthalocyanine-tetrasulfonic acid chloride (0.05 mol) (obtainable as described in U.S. Patent 2,219,330, Example 9) are pasted up with 100 parts of water at 10° C. and a suspension of 52.5 parts of the potassium salt of 4-(N-methyl-N-ethionylamino)-1-amino-benzene (0.15 mol) in 150 parts by volume of water and subsequently 5 parts of pyridine are added. By addition of dilute sodium hydroxide solution the pH-value is kept at 6.5. When the condensation is complete, the reaction mixture is diluted with 700 parts by volume of water and filtered at a temperature between 50° and 60° C. The dyestuff is precipitated from the filtrate by sodium chloride, filtered off, washed and dried in vacuo at 60° C. A water-soluble powder is obtained in a good yield. It dyes wool in fast turquoise blue tints. On cotton there are likewise obtained turquoise blue dyeings or prints of very good fastness properties.

By using instead of the potassium salt of 4-(N-methyl-N-ethionylamino) - 1 - aminobenzene, the corresponding molar amounts of the following compounds in the form of their potassium salts there are obtained dyestuffs which possess similar properties.

*Table 5*

4-N-ethyl-N-ethionylamino-1-amino-benzene
4-N-propyl-N-ethionylamino-1-amino-benzene
4-N-butyl-N-ethionylamino-1-amino-benzene
4-N-pentyl-N-ethionylamino-1-amino-benzene
4-N-methyl-N-ethionylamino-1-amino-2-methyl-benzene
4-N-methyl-N-ethionylamino-1-amino-2-methoxy-benzene
4-N-methyl-N-ethionylamino-1-amino-2-ethoxy-benzene
4-N-methyl-N-ethionylamino-1-amino-2-chloro-benzene
4-N-ethyl-N-ethionylamino-1-amino-2-methyl-benzene
4-N-butyl-N-ethionylamino-1-amino-2-methoxy-benzene
4-N-methyl-N-ethionylamino-1-amino-3-methyl-benzene
4-N-methyl-N-ethionylamino-1-amino-3-methoxy-benzene
4-N-methyl-N-ethionylamino-1-amino-3-chloro-benzene
4-N-methyl-N-ethionylamino-1-amino-2,5-dimethoxy-benzene
4-N-methyl-N-ethionylamino-1-amino-2-methoxy-5-methyl-benzene
4-N-methyl-N-ethionylamino-1-amino-3-ethoxy-benzene
3-N-methyl-N-ethionylamino-1-amino-benzene
3-N-methyl-N-ethionylamino-1-amino-4-methyl-benzene
3-N-methyl-N-ethionylamino-1-amino-4-methoxy-benzene
3-N-methyl-N-ethionylamino-1-amino-4-chloro-benzene
3-N-methyl-N-ethionylamino-1-amino-4-ethoxy-benzene
3-N-methyl-N-ethionylamino-1-amino-6-methyl-benzene
3-N-methyl-N-ethionylamino-1-amino-6-methoxy-benzene
3-N-methyl-N-ethionylamino-1-amino-6-chloro-benzene
3-N-methyl-N-ethionylamino-1-amino-6-ethoxy-benzene
3-N-methyl-N-ethionylamino-1-amino-4,6-dimethoxy-benzene
2-N-methyl-N-ethionylamino-1-amino-benzene
2-N-methyl-N-ethionylamino-1-amino-4-methyl-benzene
2-N-methyl-N-ethionylamino-1-amino-4-methoxy-benzene
2-N-methyl-N-ethionylamino-1-amino-4-chloro-benzene
2-N-methyl-N-ethionylamino-1-amino-5-methyl-benzene
2-N-methyl-N-ethionylamino-1-amino-5-methoxy-benzene
2-N-methyl-N-ethionylamino-1-amino-5-chloro-benzene

EXAMPLE 2

48.5 parts of copper phthalocyanine-tetrasulfonic acid chloride (0.05 mol) are pasted up with 100 parts by volume of water at 10° C. and a suspension of 34.8 parts of the potassium salt of 4-(N-methyl-N-ethionylamino)-1-aminobenzene (0.1 mol) in 100 parts by volume of water and subsequently 5 parts of α-picoline are added. By the addition of sodium bicarbonate the pH-value is kept at 6–6.5. When the condensation is complete the reaction mixture is diluted with 700 parts by volume of water and clarified by suction at a temperature between 50° and 60° C. The dyestuff is precipitated from the filtrate by potassium chloride, filtered off, washed and dried in vacuo at 60° C. A water-soluble powder is obtained in a good yield. It dyes polyamides in fast turquoise tints. On cotton there are obtained turquoise blue prints or dyeings of very good fastness properties.

By using instead of the potassium salt of 4-(N-methyl-N-ethionylamino)-1-aminobenzene the corresponding molar amounts of the compounds listed in Table 5 in the form of their potassium salts there are obtained dyestuffs which possess similar properties.

EXAMPLE 3

48.5 parts of copper-phthalocyanine-tetrasulfonic acid chloride (0.05 mol) are pasted up with 100 parts by volume of water at 10° C. and a suspension of 17.4 parts of the potassium salt of 4-(N-methyl-N-ethionylamino)-1-aminobenzene (0.05 mol) in 75 parts by volume of water and subsequently 5 parts of pyridine are added. By dropwise addition of a solution of sodium carbonate the pH-value is kept at 6–6.5. When the condensation is complete the reaction mixture is diluted with 500 parts by volume of water and clarified by suction at a temperature between 50° and 60° C. The dyestuff is precipitated from the filtrate by potassium chloride, filtered off, washed and dried in vacuo at 60° C. A water-soluble powder is obtained in a good yield. It dyes cotton or wool in turquoise blue tints which possess good fastness properties.

Instead of the potassium salt of 4-(N-methyl-N-ethionylamino)-1-aminobenzene there may be used the corresponding molar amounts of the compounds listed in Table 5 in the form of their potassium salts. The so obtained dyestuffs possess similar properties.

EXAMPLE 4

48.5 parts of copper-phthalocyanine-tetrasulfonic acid chloride (0.05 mol) are pasted up with 100 parts by volume of water at 10° C. and a suspension of 50.1 parts of the potassium salt of 4-(N-ethionylamino)-1-aminobenzene (0.15 mol) in 150 parts by volume of water and subsequently 5 parts of pyridine are added. By the addition of sodium acetate the pH-value is kept at 5–5.5. After completion of the condensation the reaction mixture is diluted with 500 parts by volume of water and clarified at a temperature of about 55° C. The dyestuff is then precipitated from the filtrate by potassium chloride, filtered off, washed and dried in vacuo at 60° C. A water-soluble powder is obtained in good yield. On cotton or regenerated cellulose there are obtained in the presence of sodium hydroxide or potassium hydroxide turquoise blue prints which possess good wet properties.

Instead of the potassium salt of 4-(N-ethionylamino)-1-aminobenzene there may be used the corresponding molar amounts of the following compounds (Table 6) in the form of their potassium salts. The resulting dyestuffs possess similar properties.

Table 6

3-N-ethionylamino-1-aminobenzene
2-N-ethionylamino-1-aminobenzene
4-N-ethionylamino-1-amino-2-methyl-benzene
4-N-ethionylamino-1-amino-2-chloro-benzene
4-N-ethionylamino-1-amino-3-methoxy-benzene
4-N-ethionylamino-1-amino-2-ethoxy-benzene
4-N-ethionylamino-1-amino-3-ethoxy-benzene
4-N-ethionylamino-1-amino-3-methyl-benzene
4-N-ethionylamino-1-amino-3-methoxy-benzene
4-N-ethionylamino-1-amino-3-chloro-benzene
4-N-ethionylamino-1-amino-2,5-dimethoxy-benzene
4-N-ethionylamino-1-amino-2-methoxy-5-methyl-benzene
3-N-ethionylamino-1-amino-4-methyl-benzene
3-N-ethionylamino-1-amino-4-methoxy-benzene
3-N-ethionylamino-1-amino-4-ethoxy-benzene
3-N-ethionylamino-1-amino-4-chloro-benzene
3-N-ethionylamino-1-amino-6-methyl-benzene
3-N-ethionylamino-1-amino-6-methoxy-benzene
3-N-ethionylamino-1-amino-6-ethoxy-benzene
3-N-ethionylamino-1-amino-6-chloro-benzene
3-N-ethionylamino-1-amino-4,6-dimethoxy-benzene
2-N-ethionylamino-1-amino-4-methyl-benzene
2-N-ethionylamino-1-amino-4-methoxy-benzene
2-N-ethionylamino-1-amino-4-chloro-benzene
2-N-ethionylamino-1-amino-5-methyl-benzene
2-N-ethionylamino-1-amino-5-methoxy-benzene
2-N-ethionylmaino-1-amino-5-chloro-benzene

EXAMPLE 5

48.5 parts of copper-phthalocyanine-tetrasulfonic acid chloride (0.05 mol) are pasted up with 100 parts by volume of water at 10° C. and a suspension of 33.4 parts of the potassium salt of 4-N-ethionylamino-1-amino-benzene (0.1 mol) in 100 parts by volume of water and subsequently 5 parts of pyridine are added. By addition of a solution of potassium hydrogen carbonate the pH-value is kept at 5–5.5. After completion of the condensation the reaction mixture is diluted with 500 parts by volume of water and clarified at a temperature of about 55° C. The dyestuff is then precipitated by potassium chloride, filtered off by suction, washed and dried in vacuo at 60° C. A water-soluble powder is obtained in a good yield. It dyes cotton in the presence of potassium hydroxide in turquoise blue tints which possess good fastness properties.

By using instead of the potassium salt of 4-N-ethionylamino-1-aminobenzene the corresponding molar amounts of the compounds listed above in Table 6 in the form of their potassium salts there are obtained dyestuffs which possess similar properties.

EXAMPLE 6

48.5 parts of copper-phthalocyanine-tetrasulfonic acid chloride (0.05 mol) are pasted up with 100 parts by volume of water at 10° C. and a suspension of 16.7 parts of the potassium salt of 4-N-ethionylamino-1-aminobenzene (0.05 mol) in 70 parts by volume of water and subsequently 5 parts of pyridine are added. The pH-value of the mixture is kept at 5–5.5 by dropwise addition of a solution of sodium carbonate. When the condensation is complete the reaction mixture is diluted with 500 parts by volume of water and clarified at a temperature of about 55° C. The dyestuff is then precipitated by potassium chloride, filtered off by suction washed and dried in vacuo at 60° C. A water-soluble powder is obtained in a good yield. It dyes cellulose fibers in the presence of trisodium phosphate in turquoise blue tints which possess good fastness properties.

By using instead of the potassium sale of 4-(N-ethionylamino) - 1 - amino - benzene the corresponding molar amounts of the compound listed above in Table 6 in the form of their potassium salts there are obtained dyestuffs which possess similar properties.

EXAMPLE 7

48.5 parts of copper-phthalocyanine-tetrasulfonic acid chloride (0.05 mol) are pasted up with 100 parts by volume of water at 10° C. and a suspension of 34.5 parts of 4-(N-methyl-N-isethionylamino)-1-aminobenzene (0.15 mol) in 150 parts by volume of water and subsequently 5 parts of pyridine are added. The pH-value of the mixture is kept at 5–5.5 by dropwise addition of a solution of sodium carbonate. When the condensation is complete the reaction mixture is diluted with 500 parts of water and clarified at a temperature of about 50° C. The dyestuff is then precipitated by addition of sodium chloride, filtered off by suction and dried in vacuo at 70°–80° C. 30 parts of this condensation product are introduced at a temperature below 5° C. into 300 parts of concentrated sulfuric acid and stirred for one hour until it has dissolved. This solution is then poured into a mixture of 2000 parts of a saturated potassium chloride solution and 1000 parts of ice. After stirring for half an hour, the precipitated dyestuff is filtered off by suction. The residue is repeatedly washed with a potassium chloride solution of 15% strength to remove most of the sulfuric acid. Then it is pasted up with 300 parts by volume of a potassium chloride solution of 15% strength and neutralised by addition of sodium acetate to a pH-value of about 5–5.5. After filtering off the dyestuff is dried in vacuo at a temperature of about 50°–60° C. A water-soluble blue powder is obtained in a good yield. On cotton there are obtained in the presence of sodium carbonate dyeings or prints in turquoise blue tints which possess good fastness properties.

By using instead of the 4-(N-methyl-N-isethionylamino)-1-aminobenzene the corresponding molar amounts of the following compounds (Table 7) and proceeding in an analogous manner there are obtained dyestuffs which possess similar properties.

Table 7

4-N-ethyl-N-isethionylamino-1-amino-benzene
4-N-propyl-N-isethionylamino-1-amino-benzene
4-N-butyl-N-isethionylamino-1-amino-benzene
4-N-pentyl-N-isethionylamino-1-amino-benzene
4-N-methyl-N-isethionylamino-1-amino-2-methyl-benzene
4-N-methyl-N-isethionylamino-1-amino-2-methoxy-benzene
4-N-methyl-N-isethionylamino-1-amino-2-ethoxy-benzene
4-N-methyl-N-isethionylamino-1-amino-2-chloro-benzene
4-N-ethyl-N-isethionylamino-1-amino-2-methyl-benzene
4-N-butyl-isethionylamino-1-amino-2-methoxy-benzene
4-N-methyl-N-isethionylamino-1-amino-3-methyl-benzene 4-N-methyl-N-isethionylamino-1-amino-3-methoxy-benzene
4-N-methyl-N-isethionylamino-1-amino-3-chloro-benzene
4-N-methyl-N-isethionylamino-1-amino-2,5-dimethoxy-benzene
4-N-methyl-N-isethionylamino-1-amino-2-methoxy-5-methyl-benzene
4-N-methyl-N-isethionylamino-1-amino-3-ethoxy-benzene
3-N-methyl-N-isethionylamino-1-amino-benzene
3-N-methyl-N-isethionylamino-1-amino-4-butyl-benzene
3-N-methyl-N-isethionylamino-1-amino-4-methoxy-benzene
3-N-methyl-N-isethionylamino-1-amino-4-chloro-benzene
3-N-methyl-N-isethionylamino-1-amino-4-ethoxy-benzene
3-N-methyl-N-isethionylamino-1-amino-6-methyl-benzene
3-N-methyl-N-isethionylamino-1-amino-6-methoxy-benzene
3-N-methyl-N-isethionylamino-1-amino-6-chloro-benzene
3-N-methyl-N-isethionylamino-1-amino-6-ethoxy-benzene
3-N-methyl-N-isethionylamino-1-amino-4,6-dimethoxy-benzene
2-N-methyl-N-isethionylamino-1-amino-benzene
2-N-methyl-N-isethionylamino-1-amino-4-methyl-benzene
2-N-methyl-N-isethionylamino-1-amino-4-methoxy-benzene
2-N-methyl-N-isethionylamino-1-amino-4-chloro-benzene
2-N-methyl-N-isethionylamino-1-amino-5-methyl-benzene
2-N-methyl-N-isethionylamino-1-amino-5-methoxy-benzene
2-N-methyl-N-isethionylamino-1-amino-5-chloro-benzene

EXAMPLE 8

48.5 parts of copper-phthalocyanine-tetrasulfonic acid chloride (0.05 mol) are pasted up with 100 parts by volume of water at 10° C. and a suspension of 23 parts of 4 - (N - methyl-N-isethionylamino)-1-aminobenzene (0.1 mol) in 100 parts by volume of water and subsequently 5 parts of pyridine are added. The pH-value of the mixture is kept at 5–5.5 by dropwise addition of a solution of sodium carbonate. When the condensation is complete the reaction mixture is diluted with 500 parts by volume of water and clarified at a temperature of about 50° C. The resulting condensation product is then precipiatated by the addition of sodium chloride, filtered off and dried in vacuo at 70°–80° C. 30 parts of this condensation product are esterified in an analogous manner as described in Example 7. The resulting blue dyestuff which is obtained in good yield gives on cotton or regenerated cellulose fibers in the presence of sodium bicarbonate turquoise blue tints or prints which possess good fastness properties.

Instead of 4 - (N-methyl-N-isethionylamino)-1-aminobenzene there may be used the corresponding molar amounts of the compounds listed in Table 7 and proceeded in an analogous manner there are obtained dyestuffs which possess similar properties.

EXAMPLE 9

48.5 parts of copper-phthalocyanine-tetrasulfonic acid chloride (0.05 mol) are pasted up with 100 parts by volume of water at 10° C. and a suspension of 11.5 parts of 4-(N-methyl-N-isethionylamino)-1-aminobenzene (0.05 mol) in 50 parts by volume of water and subsequently 5 parts of pyridine are added. The pH-value of the mixture is kept at 5 to 5.5 by dropwise addition of a solution of potassium bicarbonate. When the condensation is complete the reaction mixture is diluted with 500 parts by volume of water and clarified at a temperature of about 60° C. The resulting condensation product is then precipitated by the addition of sodium chloride, filtered off and dried. 30 parts thereof are esterified in an analogous manner as described in Example 7. The resulting blue dyestuff which is obtained in a good yield dyes wool in turquoise blue tints with good fastness properties.

By using instead of 4-(N-methyl-N-isethionylamino)-1-aminobenzene the corresponding molar amounts of the compounds listed in Table 7 and proceeding in an analogous manner there are obtained dyestuffs which possess similar properties.

EXAMPLE 10

48.5 parts of copper-phthalocyanine-tetrasulfonic acid chloride (0.05 mol) are pasted up with 100 parts by volume of water at 10° C. and a suspension of 32.4 parts parts of 4-(N-isethionylamino)-1-aminobenzene (0.15 mol) in 75 parts by volume of water and subsequently 5 parts of pyridine are added. The pH-value of the mixture is kept at 5 to 5.5 by dropwise addition of a solution of sodium carbonate. When the condensation is complete the reaction mixture is diluted with 500 parts by volume of water and clarified at a temperature of about 55° C. The condensation product is then precipitated by the addition of sodium chloride, filtered off and dried in vacuo at 70°–80° C. 30 parts of this product are esterified in an analogous manner as described in Example 7. The resulting blue dyestuff which is obtained in good yield in the form of a water-soluble powder gives on cotton in the presence of sodium hydroxide turquoise blue prints with good fastness properties.

By replacing 4-(N-isethionylamino)-1-aminobenzene by the corresponding molar amounts of the compounds listed in the following Table 8 and proceeding in an analogous manner there are obtained dyestuffs which possess similar properties.

Table 8

4-N-isethionylamino-1-amino-2-methyl-benzene
4-N-isethionylamino-1-amino-2-methoxy-benzene
4-N-isethionylamino-1-amino-2-ethoxy-benzene
4-N-isethionylamino-1-amino-2-chloro-benzene
4-N-isethionylamino-1-amino-3-methyl-benzene
4-N-isethionylamino-1-amino-3-methoxy-benzene
4-N-isethionylamino-1-amino-3-ethoxy-benzene
4-N-isethionylamino-1-amino-3-chloro-benzene
4-N-isethionylamino-1-amino-2,5-dimethoxy-benzene
4-N-isethionylamino-1-amino-2-methoxy-5-methyl-benzene
3-N-isethionylamino-1-amino-benzene
3-N-isethionylamino-1-amino-4-methyl-benzene
3-N-isethionylamino-1-amino-4-methoxy-benzene
3-N-isethionylamino-1-amino-4-ethoxy-benzene
3-N-isethionylamino-1-amino-4-chloro-benzene
3-N-isethionylamino-1-amino-6-methyl-benzene
3-N-isethionylamino-1-amino-6-methoxy-benzene
3-N-isethionylamino-1-amino-6-ethoxy-benzene
3-N-isethionylamino-1-amino-6-chloro-benzene
3-N-isethionylamino-1-amino-4,6-dimethoxy-benzene
2-N-isethionylamino-1-amino-benzene
2-N-isethionylamino-1-amino-4-methyl-benzene
2-N-isethionylamino-1-amino-4-methoxy-benzene
2-N-isethionylamino-1-amino-4-chloro-benzene
2-N-isethionylamino-1-amino-5-methyl-benzene
2-N-isethionylamino-1-amino-5-methoxy-benzene
2-N-isethionylamino-1-amino-5-chloro-benzene

EXAMPLE 11

48.5 parts of copper-phthalocyanine-tetrasulfonic acid chloride (0.05 mol) are pasted up with 100 parts by volume of water at 10° C. and a suspension of 21.6 parts of 4-(N-isethionylamino)-1-aminobenzene (0.1 mol) in 75 parts by volume of water and subsequently 5 parts of pyridine are added. The pH-value of the mixture is kept at 5 to 5.5 by the addition of sodium bicarbonate. When condensation is complete the reaction mixture is diluted with 500 parts by volume of water and clarified at a temperature of about 60° C. The condensation product is then precipitated by the addition of sodium chloride, filtered off and dried in vacuo at 70°–80° C. 30 parts of this product are esterified in an analogous manner as described in Example 7. The resulting dyestuff which is obtained in good yield is a blue water-soluble powder which gives on cotton in the presence of trisodium phosphate turquoise blue prints or dyeings which possess good fastness properties.

By replacing the 4-(N-isethionylamino)-1-aminobenzene by the corresponding molar amounts of the compounds listed in the above mentioned Table 8 and processing in an analogous manner there are obtained dyestuffs which possess similar properties.

EXAMPLE 12

48.5 parts of copper-phthalocyanine-tetrasulfonic acid chloride (0.05 mol) are pasted up with 100 parts by volume of water at 10° C. a suspension of 10.8 parts of 4-(N-isethionylamino)-1-aminobenzene (0.05 mol) in 50 parts by volume of water and subsequently 5 parts of picoline are added. The pH-value of the mixture is kept at 5 to 5.5 by the addition of sodium carbonate. When the condensation has finished the reaction mixture is heated to 50° C. and the condensation product is precipitated by the addition of potassium chloride, filtered off and dried in vacuo at 70°–80° C. 30 parts of this condensation product are esterified in an analogous manner as described in Example 7. The resulting dyestuff is obtained in good yield. It is blue water-soluble powder which gives on cellulose fibers in the presence of potassium hydroxide turquoise blue prints or dyeings which possess good gastness properties.

By replacing the 4-(N-isethionylamino)-1-aminobenzene by the corresponding molar amounts of the compounds listed in Table 8 by processing in an analogous manner there are obtained dyestuffs which possess similar properties.

EXAMPLE 13

48.25 parts of nickel-phthalocyanine-tetrasulfonic acid chloride (0.05 mol) obtainable in an analogous manner as described in U.S. Patent 2,219,330 are pasted up with 200 parts by volume of water at 10° C. and 52.5 parts of the potassium salt of 4-(N-methyl-N-ethionylamino)-1-aminobenzene (0.15 mol) are introduced and subsequently 5 parts of pyridine are added. By the addition of diluted sodium hydroxide solution the pH-value is kept at 6 to 6.5. When the condensation is complete the reaction mixture is diluted with 800 parts by volume of water and brought to 50° to 60° C. The dyestuff is then precipitated by potassium chloride, filtered off, washed and dried in vacuo at about 60° C. A water-soluble dark powder is obtained in good yield. It dyes wool in fast greenish blue shades. On cotton there are obtained in the presence of sodium bicarbonate greenish blue dyeings or prints of very good fastness properties and high brilliancy.

By replacing the potassium salt of 4-(N-methyl-N-ethionylamino)-1-aminobenzene by the corresponding molar amounts of the compounds listed above in Table 5 in the form of their potassium salts there are obtained dyestuffs which possess similar properties.

Starting with 48.25 parts of nickel-phthalocyanine-tetrasulfonic acid chloride instead of 48.5 parts of copper-phthalocyanine-tetrasulfonic acid chloride and working in the analogous manner as described in the Examples 2 to 12 there are obtained greenish blue dyestuffs which possess similar tinctorial properties.

We claim:

1. A water-soluble phthalocyanine dyestuff of the formula

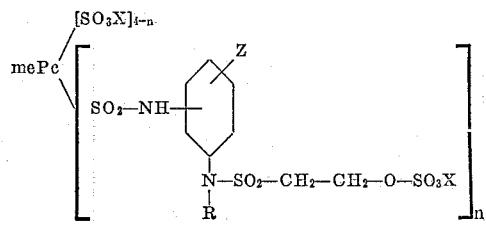

wherein mePc represents a member selected from the group consisting of copper phthalocyanine and nickel phthalocyanine, R represents a member selected from the group consisting of hydrogen and alkyl having from 1 to 5 carbon atoms, Z represents a member selected from the group consisting of hydrogen, chlorine, bromine, lower alkyl and lower alkoxy, X represents a member selected from the group consisting of hydrogen and alkali metal, and $n$ represents an integer from 1 to 3.

2. The dyestuff of the formula

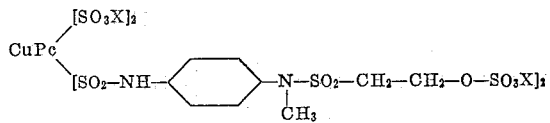

wherein Pc represents phthalocyanine and X is a member selected from the group consisting of hydrogen, sodium and potassium.

3. The dyestuff of the formula

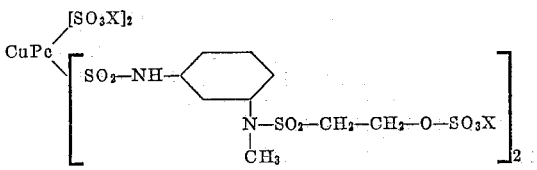

wherein Pc represents phthalocyanine and X represents a member selected from the group consisting of hydrogen, sodium and potassium.

4. The dyestuff of the formula

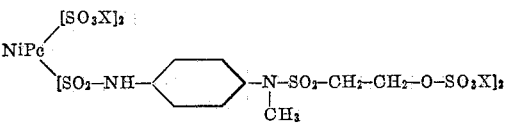

wherein Pc represents phthalocyanine and X represents a member selected from the group consisting of hydrogen, sodium and potassium.

5. The dyestuff of the formula

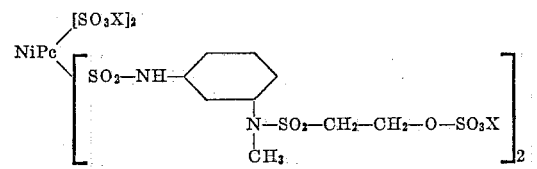

wherein Pc represents phthalocyanine and X represents a member selected from the group consisting of hydrogen, sodium and potassium.

6. A water-soluble phthalocyanine dyestuff of the formula

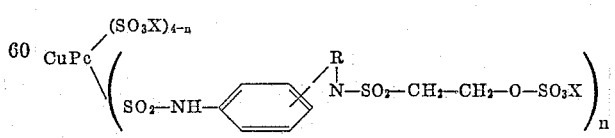

wherein Pc represents phthalocyanine, R represents an alkyl group having from 1 to 5 carbon atoms, X represents hydrogen or alkali metal, and $n$ represents the integer 1 or 2, the

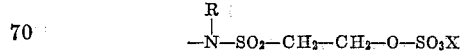

group being in a position other than ortho to the —SO₂—NH— group in said dyestuff.

(References on following page)

References Cited

UNITED STATES PATENTS 3,062,831  11/1962  Freyermuth et al. __ 260—314.5

FOREIGN PATENTS 611,053  6/1962  Belgium.
628,209  8/1963  Belgium.

OTHER REFERENCES

Farb. Hoechst A. G., Chemical Abstracts, vol. 61 (October 26, 1964), page 10808.

WALTER A. MODANCE, *Primary Examiner.*

JAMES A. PATTEN, *Examiner.*